(12) United States Patent
Maetschke (10) Patent No.: US 6,771,804 B1
(45) Date of Patent: Aug. 3, 2004

(54) METHOD AND APPARATUS FOR SIGNAL SEGMENTATION

(75) Inventor: Stefan Maetschke, Unterrieden (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/572,024

(22) Filed: May 16, 2000

(51) Int. Cl.$^7$ ............... G06K 9/00; G06K 9/34; G06K 9/38
(52) U.S. Cl. ........... 382/141; 382/170; 382/171; 382/172
(58) Field of Search ............... 382/171, 282, 382/112, 130, 141–145, 147, 149, 165, 168, 170–172; 345/180, 549

(56) References Cited

U.S. PATENT DOCUMENTS 5,003,616 A * 3/1991 Orita et al. ............... 382/282
6,389,162 B2 * 5/2002 Maeda ..................... 382/172

OTHER PUBLICATIONS

Bernd Jähne, Digitale Bildverarbeitung, pp. 162–165 and 321–329.
Peter Haberäeker, Praxis der Digitalen Bildverarbeitung and Mustererkennung, pp. 36–45.
Dr. Hartmut Ernst, Einführung in die digitale Bildverarbeitung, pp. 122–125.
Wolfgang Abmayr, Einführung in die digitale Bildverarbeitung, 1994, pp. 223–233 and 272–275.

* cited by examiner

*Primary Examiner*—Wenpeng Chen
(74) *Attorney, Agent, or Firm*—Foley & Lardner LLP (57) ABSTRACT

A system and method of separating subject data from background data in a signal data set includes generating a frequency distribution of the subject data and background data based on a characteristic; identifying a maximum of the frequency distribution; establishing a first threshold to one side of the maximum; establishing a second threshold to another side of the maximum; and assigning data outside the first and second thresholds as one of the subject data and the background data.

54 Claims, 7 Drawing Sheets

METHOD AND APPARATUS FOR SIGNAL SEGMENTATION

FIELD OF THE INVENTION

The present invention relates generally to the field of signal processing. More particularly, the present invention relates to signal segmentation.

BACKGROUND OF THE INVENTION

In the field of signal processing, signal segmentation is used to separate one portion of a signal (e.g., subject data) from another (e.g., background data). Preferably, signal segmentation occurs automatically based on a known characteristic about the signal.

For example, in industrial automation, video cameras are used to capture digital images of manufactured products, such as, fabricated parts, welds, etc. The digital images are used to assess the quality of the manufactured product. Using the example of a weld, a video camera automatically takes digital images of a series of welds on a product, segments each weld from its respective background, and either displays it to a human operator or makes a quality determination based on preprogrammed desirable or undesirable characteristics of the weld.

However, existing methods for segmenting subject data from background data are lacking. According to one method, a histogram is generated representing the frequency of the gray scale values of the pixels of the image. A bimodal frequency distribution is presupposed, with a large mode representing the background and another, generally smaller, mode representing the image. A threshold is drawn between the large mode and the smaller mode of the histogram. Pixels on one side of the threshold are attributed to the background and pixels on the other side of the threshold are attributed to the image.

One drawback of this method is that often the image includes pixels that are both darker and lighter than the background. This is particularly true in an industrial setting where the background becomes dirty from manufacturing processes and/or the lighting provided to the background fluctuates. Therefore, more than two modes occur in the histogram, and the selected threshold frequently misallocates important data points.

Accordingly, what is needed is an improved method and apparatus for signal segmentation. The method and apparatus would more accurately separate a subject from the background. The method and apparatus would further accurately separate a subject from a background when the object is both lighter and darker than the background, and when the background includes a structured surface, dirt, shadows, etc. In addition, the method would be capable of handling images having great variations in overall brightness by compensating for the overall brightness. Further still, the method and apparatus would be applicable to other signals, such as one-dimensional and three-dimensional signals, to segment a portion of interest from the background signal.

SUMMARY OF THE INVENTION

According to one exemplary embodiment, a method of separating subject data from background data in a signal data set includes generating a frequency distribution of the subject data and background data based on a characteristic; identifying a maximum of the frequency distribution; establishing a first threshold to one side of the maximum; establishing a second threshold to another side of the maximum; and assigning data outside the first and second thresholds as one of the subject data and the background data.

According to an alternative embodiment, an apparatus for segmenting subject data from background data in an image data set is disclosed. The apparatus includes a video camera and a signal processing circuit. The video camera is configured to acquire the image data set. The signal processing circuit is coupled to the video camera and is configured to receive the image data set, generating a frequency distribution of the subject data and the background data based on a characteristic, identify a maximum point of the frequency distribution, establish a first threshold point to one side of the maximum point, establish a second threshold point to another side of the maximum point, and assign data points outside the first and second threshold points as one of the subject data and the background data.

According to yet another exemplary embodiment, a method of separating subject data from background data in a signal data set is disclosed. The method includes providing a background data set free of subject data; subtracting the background data set from the signal data set to generate resulting data and generating a frequency distribution of the resulting data; identifying a maximum of the frequency distribution; establishing a threshold to one side of the maximum of the signal data set; and assigning data points on one side of the threshold as one of the subject data and the background data.

According to still another exemplary embodiment, a system for separating subject data from background data in a single data set is disclosed. The system includes a means for generating a frequency distribution of the subject data and background data based on a characteristic; a means for identifying a maximum of the frequency distribution; a means for establishing a first threshold to one side of the maximum point; a means for establishing a second threshold to another side of the maximum point; and a means for assigning data between the first and second thresholds as one of the subject data and the background data.

BRIEF DESCRIPTION OF THE DRAWINGS

The invention will become more fully understood from the following detailed description, taken in conjunction with the accompanying drawings, wherein like reference numerals referred to like parts, and in which.

DESCRIPTION OF THE EXEMPLARY EMBODIMENTS

Figure 1:
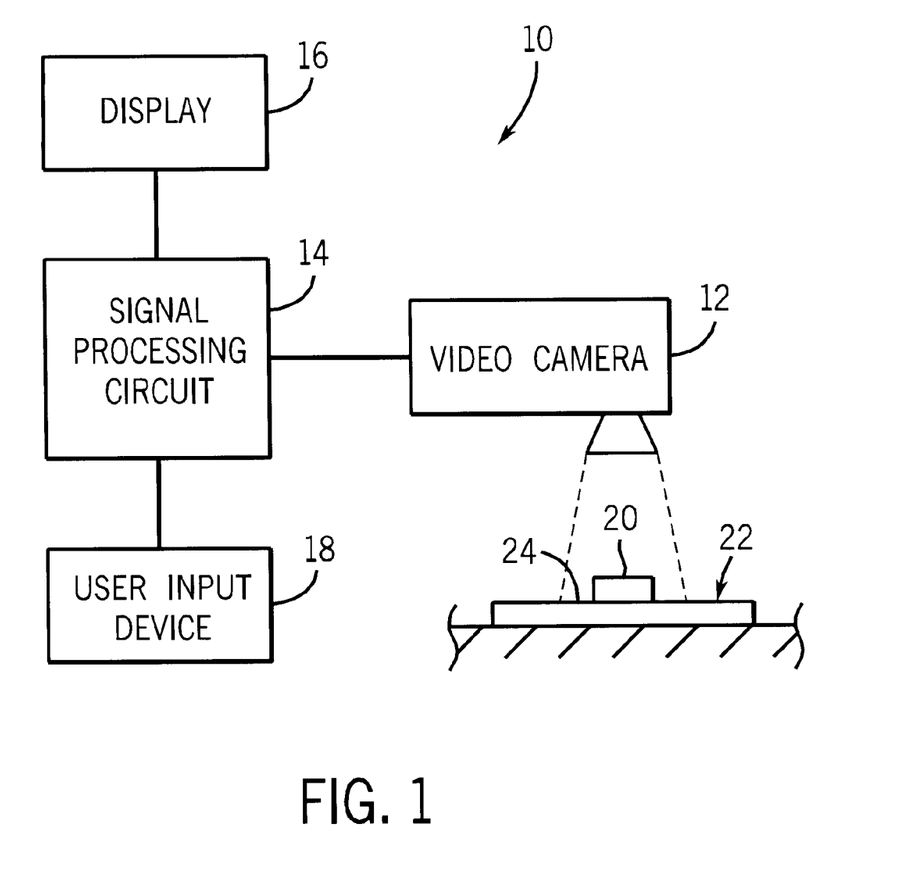
FIG. 1 is a block diagram of an image acquiring and segmenting system according to an exemplary embodiment.

Referring first to FIG. 1, an exemplary system for acquiring and segmenting a signal data set is shown. An image acquiring and segmenting system 10 includes a video camera 12 and signal processing circuit 14, and optionally a display 16 and user input device 18. System 10 acquires a signal data set 26 (e.g., an image data set) (see FIG. 2) of a subject 20 (e.g., an object) on a conveyor belt 22. System 10 may be implemented on a multisignal processing system, such as, SIMULTAN, manufactured by Siemens AG, Munich, Germany. While one embodiment of the system will be described with reference to a system for segmenting an image, it is understood that the principles disclosed herein are applicable to systems for segmenting other two-dimensional signals, one-dimensional signals (e.g., a sound signal), and other multi-dimensional signals.

Figure 2:
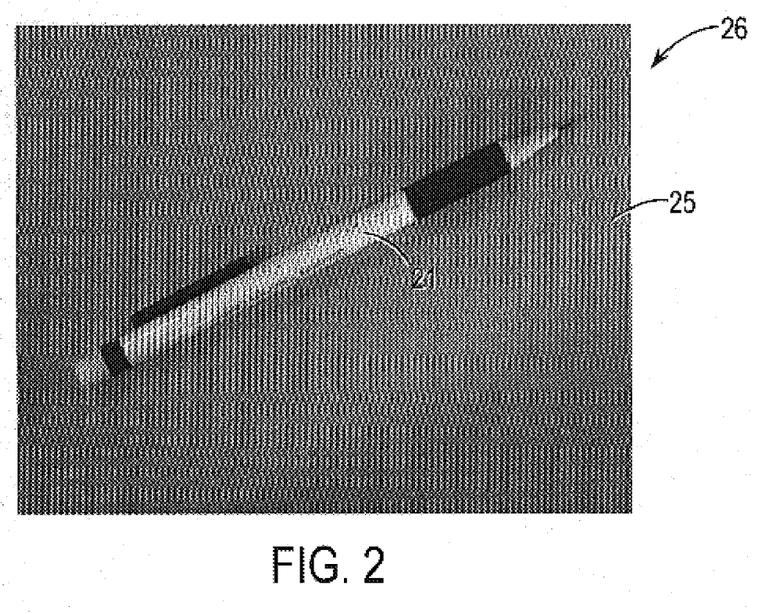
FIG. 2 is a digital image including subject data and background data.

Video camera 12 is configured to acquire a signal data set 26 in the form of a digital image of subject 20 against a background 24 or portion of conveyor belt 22. In this exemplary embodiment, subject 20 is a mechanical pencil. FIG. 2 shows signal data set 26 (e.g., a digital image of a mechanical pencil) as viewed by video camera 12. Signal data set 26 includes subject data 21 and background data 25. Video camera 12 acquires signal data set 26 in gray scale and transmits signal data set 26 to signal processing circuit 14. Alternatively, video camera 12 may acquire signal data set 26 in color and transmit separate signal data sets for red, green, and blue for each image.

Signal processing circuit 14 (i.e., a computer) includes a programmed microprocessor (e.g., an INTEL x86 processor, microcontroller, etc.), memory, communication interfaces, etc. Alternatively, signal processing circuit 14 may comprise programmable logic, discrete circuit components, etc. Circuit 14 operates according to a software or hardware program stored in memory (e.g., hard disk storage, firmware, non-volatile memory, etc.), is configured to perform various signal processing functions on the received signal data set, and may further be configured to provide display signals to display 16 (e.g., a cathode-ray tube, liquid crystal display, etc.) and receive user input from user input device 18 (e.g., a keyboard, touchscreen, etc.).

Figure 3:
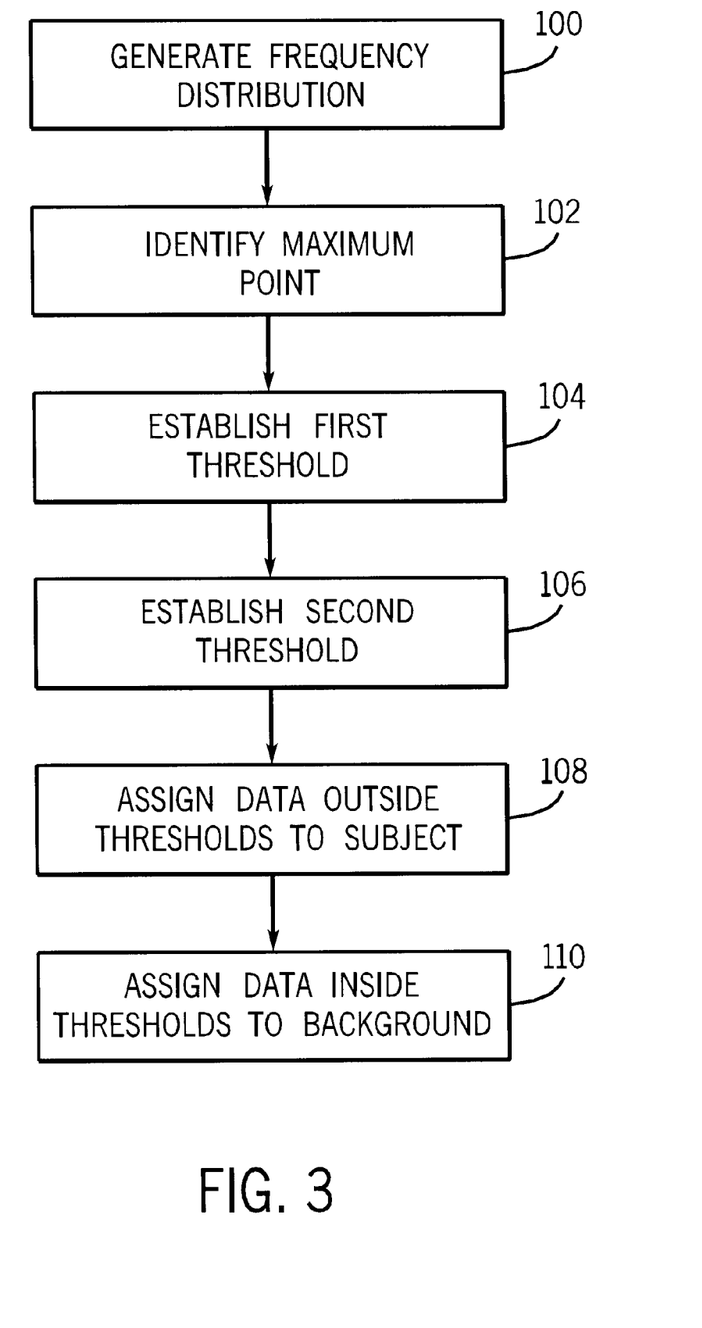
FIG. 3 is a flow diagram showing steps according to an exemplary system and method.
Figure 4:
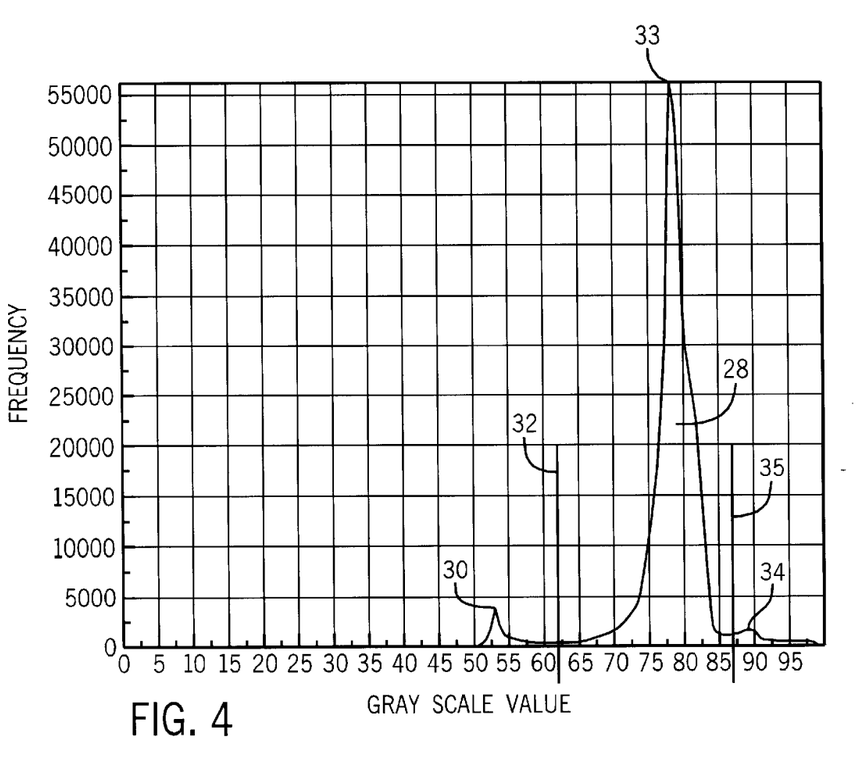
FIG. 4 is a frequency distribution generated according to an exemplary embodiment.

Referring now to FIGS. 3 and 4, steps performed by circuit 14 will now be described wherein circuit 14 segments or separates subject data 21 in signal data set 26 from background data 25 based on a characteristic, such as, gray scale, amplitude, color, etc. Thus, after signal data set 26 is acquired, at step 100, circuit 14 generates a frequency distribution (e.g., a histogram) of signal data set 26 based on the frequency of occurrence of each gray scale value in signal data set 26. The x-axis of FIG. 4 represents gray scale value and the y-axis represents frequency. The gray scale values range from −255 to 255 in this exemplary embodiment, with a value of zero (0) representing black. However, to reduce processing time and to get a smooth histogram, gray scale values are grouped into ranges. In FIG. 4, 100 groups are established based on 512 possible gray scale values, meaning approximately five gray scale values are represented in each x-axis point. On the x-axis of FIG. 4, "50" represents gray scale values near zero (i.e. black) and "100" represents gray scale values near 255 (i.e. white). "0" through "50" represent gray scale values between −255 and 0, which do not have actual data points associated therewith, but which are necessary in the embodiment of FIG. 6 in which a background image is subtracted from signal data set 26. The range of frequencies (i.e., from 0 to 55,000 in this example) is dependent upon the size of signal data set 26 and the resolution of the acquired image.

Three modes are seen in the frequency distribution of FIG. 4. A background mode 28 includes mostly background data 25, a first subject mode 30 includes mostly subject data 21, and a second subject mode 34 also includes mostly subject data 21. First subject mode 30 includes subject data darker than the background and second subject mode 34 includes subject data lighter than the background. The x-position of background mode 28 represents the image brightness and the magnitude of background mode 28 provides information about the uniformity of the background image.

Next, at step 102, circuit 14 identifies a highest or approximately the highest point 33 of the frequency distribution. Then, at step 104, a first threshold 32 is established by examining the points to the left of mode 28 until a minimum or approximately the minimum point between modes 28 and 30 is located. First threshold 32 is created at this minimum point. Then, at step 106, a second threshold 35 is established by examining points to the right of mode 28 until a minimum or approximately the minimum point between modes 28 and 32 is located. Second threshold 35 is created at this minimum point. With thresholds 32 and 35 established, at steps 108 and 110, all data outside of the thresholds are assigned to subject 20 and all data inside of the thresholds are assigned to background 24. Advantageously, whether subject 20 is lighter, darker, or both lighter and darker than background 24, object data 21 is still reliably segmented from background data 25. Also, the method operates well over a range of image brightnesses. If the whole image becomes brighter, the maximum or highest point 33 will move to the right and if the whole image becomes darker, the maximum will move to the left. Since the algorithm sets thresholds 32 and 35 relative to this maximum, the process works equally well over a range of brightnesses.

Figure 5:
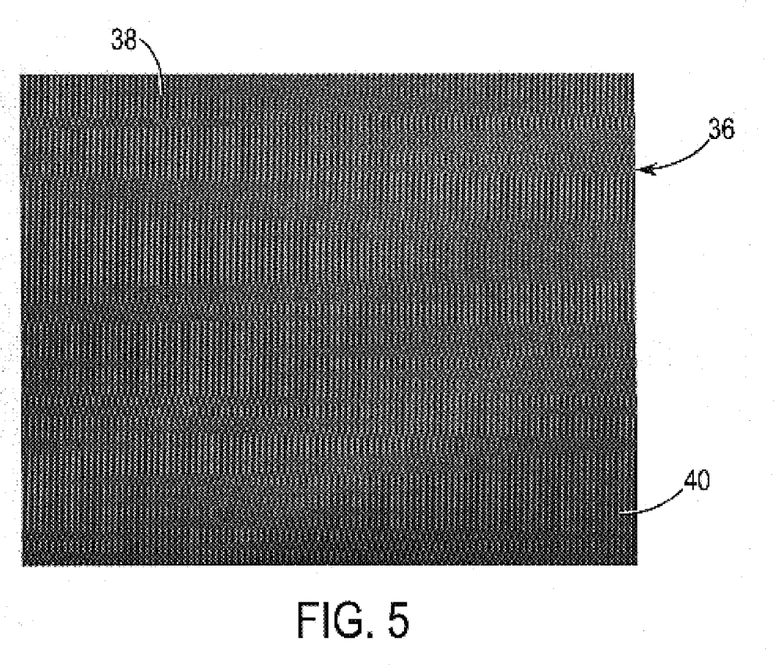
FIG. 5 is a background image.
Figure 6:
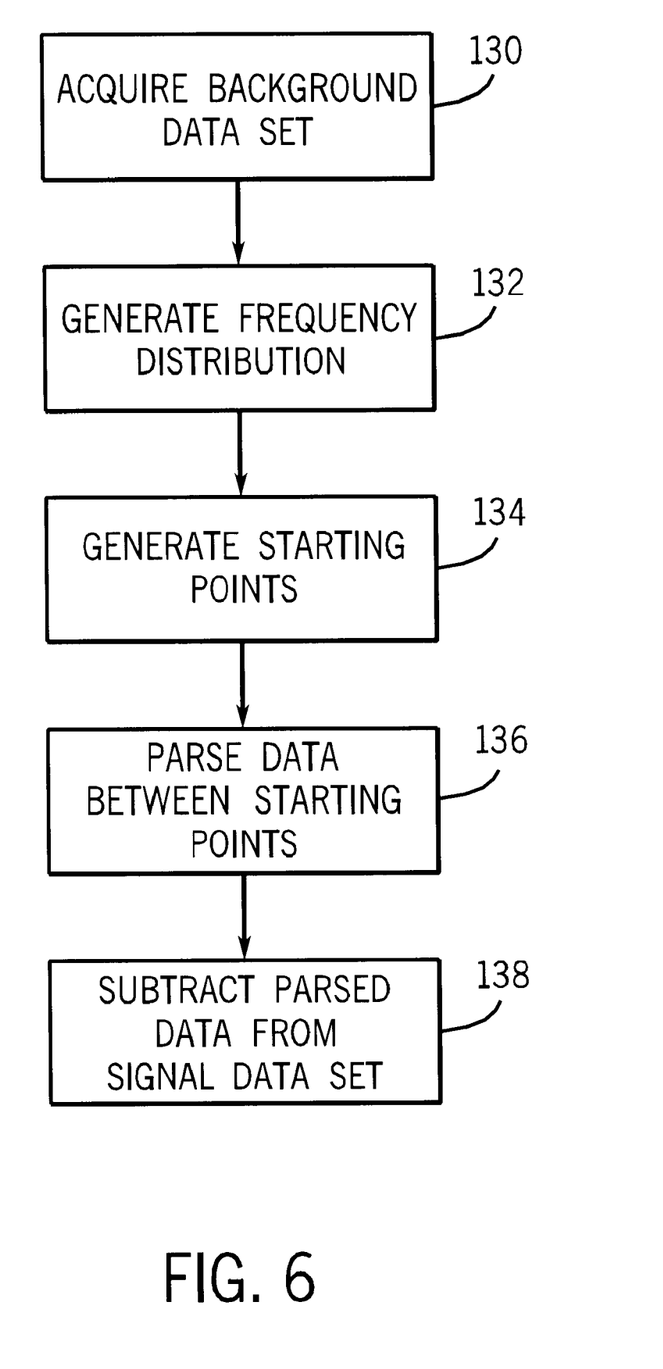
FIG. 6 is a flow diagram showing a system and method according to an exemplary embodiment.
Figure 7:
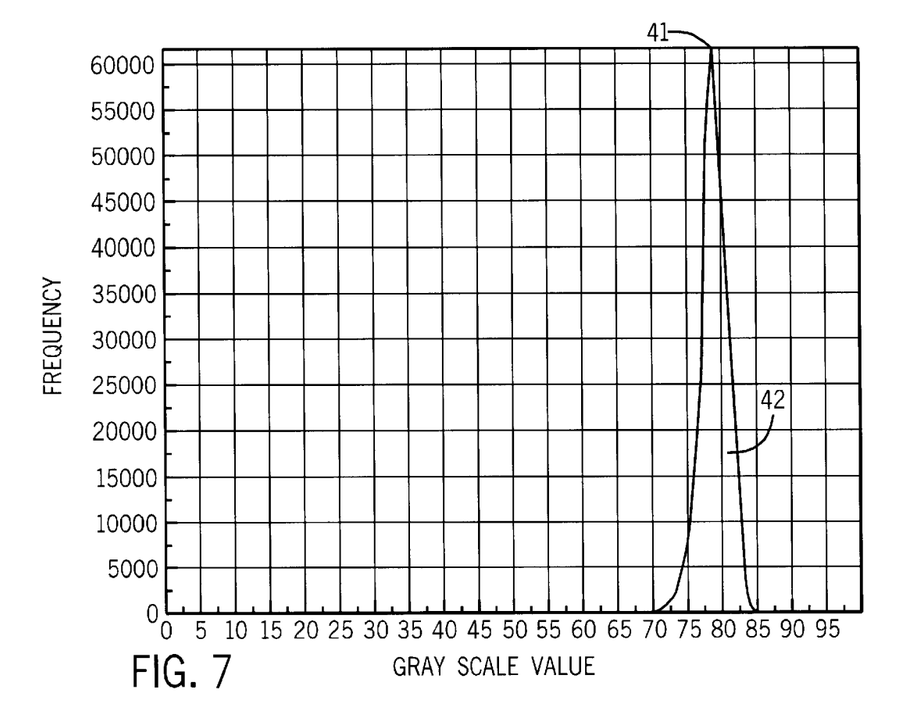
FIG. 7 is a frequency distribution of the background image of FIG. 5.

Referring now to FIGS. 5–7, a further feature will now be described relating to compensating for a non-uniform background. In FIG. 4, it can be seen that the narrower background mode 28 is, the better the segmentation that will result since the locations of the thresholds can be determined with greater accuracy. A wider background mode 28 is caused by a wider range of gray scale values in background 24 caused by non-uniformity in background brightness. It can be seen that background data set 36 in FIG. 5 is non-uniform, including some lighter areas 38 and some darker areas 40 caused by shadows, dirt, etc.

Accordingly, at step 130, a background data set 36 is acquired representative of background 24 but free of subject data. This can be acquired in several ways. For example, video camera 12 can acquire an image of background 24 when subject 20 is absent, for example, during a system configuration step. However, this may not be practical in all applications. An alternative is to construct artificial backgrounds. In this case, theoretical information about the background is gathered (e.g., illumination, gray value, edges, corners, etc). Yet another alternative is to parse small pieces from a signal data set, pieces which do not contain subject data, such as the corners of an image data set, and construct a complete background image with these pieces. Next, at step 132, a frequency distribution of background data set 36 based on the gray scale characteristic is generated. A single, large background mode 42 results, such as that shown in FIG. 7. Alternatively, the mean value of a plurality of background frequency distributions can be calculated (e.g., two or more background frequency distributions) to compensate for variations between acquired background images taken at different times or locations on background 24.

Next, at step 134, starting points are generated on both sides of background mode 42. The purpose of generating starting points is to eliminate from background mode 42 as many gray scale values as possible which may be included in subject 20 before background mode 42 is subtracted from signal data set 26. Starting points are generated by first identifying the maximum or approximate maximum point 41 of background mode 42. Next, starting points are established to the left and right of large mode 42 at points where the frequency of gray scale values is approximately two standard deviations from the maximum point. Alternatively, other multiples of the standard deviation can be used. The greater the multiple, the more likely that gray scale values corresponding to subject 20 will be subtracted out when background mode 42 is subtracted from signal data set 26, resulting in lost subject data. The lesser the multiple, the less likely that subject data will be lost, but the wider the resulting background mode will be, resulting in lost subject data when establishing thresholds in steps 104 and 106 (FIG. 3). Next, at step 136, the data between the starting points is parsed from the remaining data to generate a parsed background data set.

Figure 8:
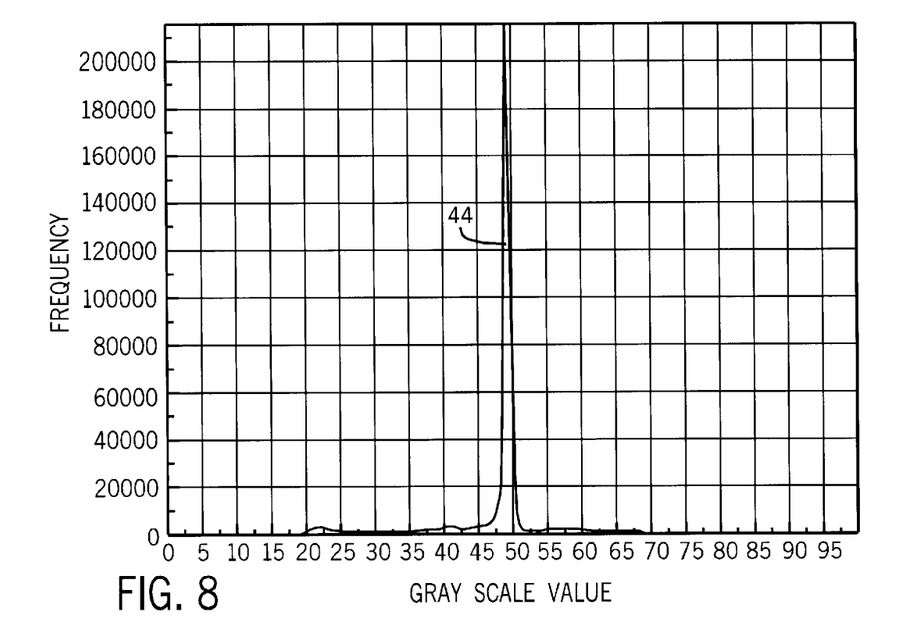
FIG. 8 is a frequency distribution of the image of FIG. 2 minus the mean value of three background images.
Figure 9:
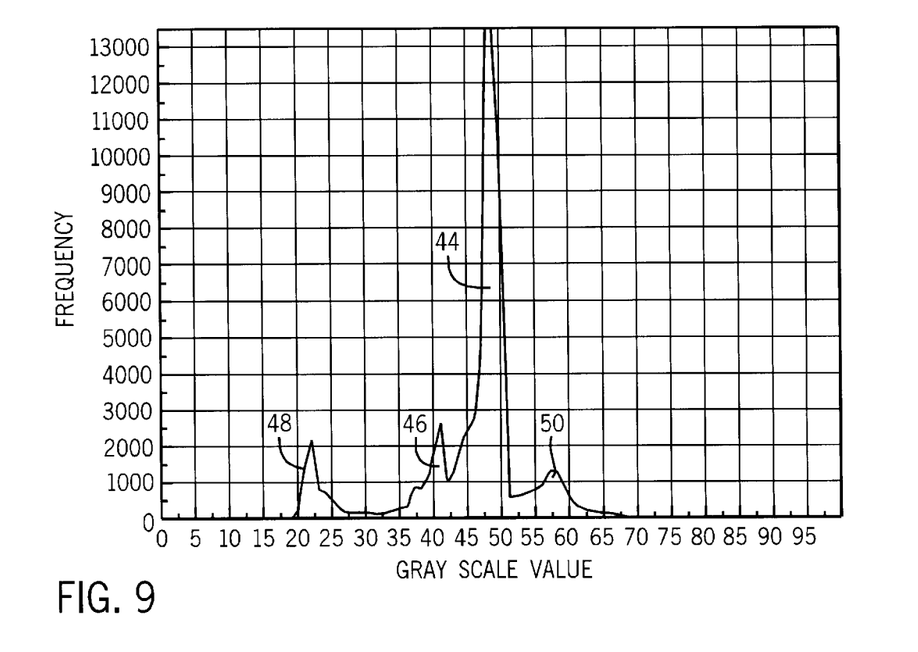
FIG. 9 is an enlarged view of a portion of the frequency distribution of FIG. 8.

Each of steps 130–136 can occur during a system configuration process, before system operation. During system operation (FIG. 3), before step 100, the parsed background data set is subtracted 138 from the signal data set 26 on a pixel-by-pixel basis. FIGS. 8 and 9 show the frequency distribution resulting from this subtraction step. A very large, narrow background mode 44 results representative of background 24. Background mode 44 is centered near the gray scale value of zero (0) (shown as "50" after grouping) due to the subtraction step. Specifically, the gray scale value of each background data point in the signal data set minus the gray scale value of each background data point in the parsed background data set will be approximately equal to zero, corresponding to point 50 on the x-axis of FIG. 8. A zoom of FIG. 8 is shown in FIG. 9, wherein background mode 44 is more easily segmented using the system shown in FIG. 3 from object modes 46, 48, and 50.

Figure 10:
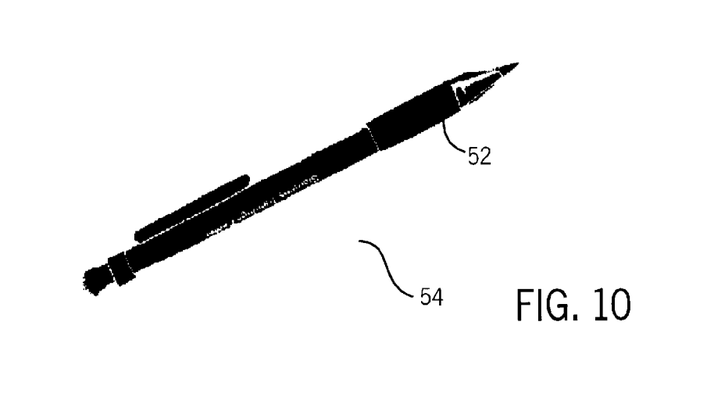
FIG. 10 is a digital image created by using the principles disclosed herein.

FIG. 10 shows the results of a segmentation using the principles disclosed herein. The black data 52 represents the object and the white data 54 represents the background. This object was segmented by subtracting signal data set 26 from the mean value of three background data sets such as background data set 36, identifying the maximum of the resulting frequency distribution, searching left and right of the maximum point for the nearest minima, placing thresholds at the minima, and assigning all points outside the thresholds to the object. The gray scale values of black data 52 are preserved and may be displayed or further processed by circuit 14 for analysis.

While the exemplary embodiments have been disclosed with reference to an image data set, the principles disclosed herein are similarly applicable to other data sets, such as a sound signal resulting from a running motor or testing tiles. In a sound signal, the subject data would be a portion of interest of the sound signal. In the manufacture of tiles, the quality of the tile can be tested by tapping the tile and analyzing the sound signal which results. For example, a quickly decreasing sound amplitude can indicate a faulty part, whereas a sound amplitude which decreases more slowly may indicate a good part. It should be understood that the embodiments disclosed herein are offered by way of example only. The invention is not limited to a particular embodiment, but extends to various modifications that nevertheless fall within the scope of the appended claims.

What is claimed is:

1. In a computerized system, a method of separating subject data from background data in a signal data set, comprising:

providing a background data set free of subject data;

subtracting the background data set from the signal data set to form a resulting data set;

generating the frequency distribution of the subject data and the background data based on the resulting data set;

identifying a maximum of the frequency distribution;

establishing a first threshold to one side of the maximum;

establishing a second threshold to another side of the maximum; assigning data outside the first and second thresholds as one of the subject data and the background data; and segmenting the signal data set based on the assignment of data as one of the subject data and the background data.

2. The method of claim 1, further comprising assigning data between the first and second thresholds to the other of the subject data and the background data.

3. The method of claim 1, wherein the characteristic is gray scale value.

4. The method of claim 1, wherein the signal data set comprises image data.

5. The method of claim 1, wherein the first threshold is established at a minimum between the maximum and a mode.

6. The method of claim 5, wherein the second threshold is established at a minimum between the maximum and a second mode.

7. The method of claim 1, wherein the frequency distribution is generated by grouping the subject data and background data into ranges of the characteristic.

8. The method of claim 1, further comprising analyzing a portion of the data that has been segmented based on the assignment of data as one of the subject data and the background data, the portion of the data including subject data.

9. The method of claim 1, further comprising analyzing a portion of the data that has been segmented based on the assignment of data as one of the subject data and the background data, the portion of the data including an image of a manufactured product.

10. The method of claim 9, wherein analyzing a portion of the data comprises analyzing a weld in the manufactured product.

11. The method of claim 9, wherein analyzing a portion of the data comprises analyzing the data based on preprogrammed desirable or undesirable characteristics of the manufactured product.

12. The method of claim 1, wherein the subject data is assigned between the first threshold and the second threshold.

13. In a computerized system, a method of separating subject data from background data in a signal data set, comprising:

generating a frequency distribution of subject data and background data based on a characteristic;

identifying a maximum of the frequency distribution;

establishing a first threshold to one side of the maximum;

establishing a second threshold to another side of the maximum;

assigning data outside the first and second thresholds as one of the subject data and the background data;

providing a background data set free of subject data;

subtracting the background data set from the signal data set to form a resulting data set;

and generating the frequency distribution of the subject data and the background data based on the resulting data set.

14. The method of claim 13, wherein the step of providing a background data set free of subject data includes providing a plurality of background data sets free of subject data and generating the background data set based on the mean value of the plurality of background data sets.

15. The method of claim 13, further comprising:

generating a frequency distribution of the background data set based on the characteristic; and eliminating data from the background data set having characteristic values greater than the characteristic value associated with a predetermined starting point on the frequency distribution of the background data set.

16. The method of claim 15, further comprising establishing the predetermined starting point as a multiple of the standard deviation from a maximum point on the frequency distribution of the background data set.

17. An apparatus for segmenting subject data from background data in an image data set, comprising:

a video camera configured to acquire the image data set; and a signal processing circuit coupled to the video camera configured to receive a background data set free of subject data, receive the image data set, subtract the background data set from the image data set to form a resulting data set; generate a frequency distribution based on the resulting data set, identify a maximum point of the frequency distribution, establish a first threshold point to one side of the maximum point, establish a second threshold point to another side of the maximum point, and assign data points outside the first and second threshold points as one of the subject data and the background data, and segment the signal data set based on the assignment of data as one of the subject data and the background data.

18. The apparatus of claim 17, wherein the characteristic is gray scale value.

19. The apparatus of claim 17, wherein the first threshold point is established at a minimum point between the maximum point and a mode.

20. The apparatus of claim 17, wherein the frequency distribution is generated by grouping the data points into ranges of the characteristic.

21. In a computerized system, a method of separating subject data from background data in a signal data set, comprising:

providing a background data set free of subject data;

subtracting the background data set from the signal data set to generate resulting data and generating a frequency distribution of the resulting data;

identifying a maximum of the frequency distribution;

establishing a threshold to one side of the maximum of the signal data set; and assigning data points on one side of the threshold as one of the subject data and the background data.

22. The method of claim 21, further comprising:

receiving a second background data set free of subject data; and providing the background data set based on the mean value of the background data set and the second background data set.

23. The method of claim 21, further comprising:

generating a frequency distribution of the background data set; and eliminating data from the background data set having values greater than the value associated with a predetermined starting point on the frequency distribution of the background data set.

24. The method of claim 23, further comprising establishing the predetermined starting point as a multiple of the standard deviation from a maximum point on the frequency distribution of the background data set.

25. The method of claim 21, further comprising:

establishing a second threshold to another side of the maximum of the signal data set; and assigning data points between the threshold points as one of the subject data and the background data.

26. The method of claim 25, further comprising assigning the data points outside the threshold points as the subject data.

27. A system for separating subject data from background data in a signal data set, comprising:

means for generating a frequency distribution based on a data set comprising a background data set free of subject data subtracted from an image data set;

means for identifying a maximum of the frequency distribution;

means for establishing a first threshold to one side of the maximum point;

means for establishing a second threshold to another side of the maximum point;

means for assigning data between the first and second thresholds as one of the subject data and the background data; and means for segmenting the signal data set based on the assignment of data as one of the subject data and the background data by the means for assigning data between the first and second thresholds as one of the subject data and the background data.

28. The system of claim 27, further comprising means for generating the signal data set.

29. The system of claim 27, further comprising means for assigning data outside the first and second thresholds to the other of the subject data and the background data.

30. The system of claim 27, wherein the characteristic is gray scale value.

31. The system of claim 27, wherein the signal data set comprises image data.

32. The system of claim 27, wherein the first threshold is established at a minimum point between the maximum and a mode.

33. The system of claim 27, further comprising means for grouping the data into ranges of the characteristic.

34. A system for separating subject data from background data in a signal data set, comprising:

means for generating a frequency distribution of the subject data and background data based on a characteristic;

means for identifying a maximum of the frequency distribution;

means for establishing a first threshold to one side of the maximum point;

means for establishing a second threshold to another side of the maximum point;

means for assigning data between the first and second thresholds as one of the subject data and the background data;

means for providing a background data set free of subject data; and means for subtracting the background data set from the signal data set to generate a resulting data set, the frequency distribution of the subject data and background data based upon the resulting data.

35. The system of claim 34, further comprising:

means for generating a frequency distribution of the background data set; and means for eliminating data from the background data set having values greater than the value associated with a predetermined starting point on the frequency distribution of the background data set.

36. In a computerized system, a method of separating subject data from background data in a series of signal data sets, comprising:

separating subject data from background data in each signal data set, wherein for each signal data set, separating subject data from background data comprises;
  subtracting a background data set free of subject data from the signal data set to form a resulting data set;
  generating a frequency distribution of the subject data and background data based on the resulting data set;
  setting a first threshold and a second threshold for the signal data set based on a point identified in the frequency distribution of the signal data set;
  assigning data outside the first and second thresholds in the signal data set as one of the subject data and the background data; and
  segmenting the signal data set based on the assignment of data as one of the subject data and the background data.

37. The method of claim 36, wherein the frequency distribution is based on gray scale value.

38. The method of claim 36, wherein the point used to set the first and second thresholds is approximately the maximum of the frequency distribution.

39. The method of claim 36, further comprising, for each signal data set, analyzing a portion of the data that has been segmented based on the assignment of data as one of the subject data and the background data, the portion of the data including subject data.

40. The method of claim 36, further comprising analyzing, for each signal data set, a portion of the data that has been segmented based on the assignment of data as one of the subject data and the background data, the portion of the data including an image of a manufactured product.

41. The method of claim 40, wherein analyzing a portion of the data comprises analyzing a weld in the manufactured product.

42. The method of claim 40, wherein analyzing a portion of the data comprises analyzing the data based on preprogrammed desirable or undesirable characteristics of the manufactured product.

43. The method of claim 36, wherein the subject data is assigned between the first threshold and the second threshold.

44. The method of claim 36, wherein the frequency distribution is generated based on a color value.

45. In a computerized system, a method of separating subject data from background data in a series of signal data sets, comprising:

separating subject data from background data in each signal data set, wherein for each signal data set, separating subject data from background data comprises;
  subtracting a background data set free of subject data from the signal data set to form a resulting data set;
  generating a frequency distribution of the subject data and background data based on the resulting data set;
  setting a first threshold and a second threshold for the signal data set based on a point related to a maximum in the frequency distribution of the signal data set;
  evaluating the frequency distribution to identify a mode; and
  assigning data outside the first and second thresholds in the signal data set as one of the subject data and the background data;
  wherein the first threshold for each signal data set is established based on a value of the point and a value of the mode.

46. The method of claim 45, wherein the first threshold is set at a value that has a minimum frequency between a value of the point and a value of the mode.

47. The method of claim 45, further comprising segmenting the signal data set based on the assignment of data as one of the subject data and the background data.

48. The method of claim 45, wherein the point is the maximum.

49. The method of claim 48, wherein the first threshold is set at a value that has a minimum frequency between a value of the point and a value of the mode.

50. The method of claim 48, further comprising segmenting the signal data set based on the assignment of data as one of the subject data and the background data.

51. In a computerized system, a method of separating subject data from background data in a series of signal data sets, comprising:

providing a background data set free of subject data; and separating subject data from background data in each signal data set, wherein for each signal data set, separating subject data from background data comprises;
  subtracting the background data set from the signal data set to form a resulting data set;
  generating a frequency distribution of the subject data and the background data for the signal data set based on a characteristic and based on the resulting data set;
  setting a first threshold and a second threshold for the signal data set based on a point identified in the frequency distribution of the subject data and the background data; and
  assigning data outside the first and second thresholds in the signal data set as one of the subject data and the background data.

52. The method of claim 51, further comprising:

generating a frequency distribution of the background data set based on the characteristic; and eliminating data from the background data set having characteristic values greater than the characteristic value associated with a predetermined starting point on the frequency distribution of the background data set.

53. The method of claim 51, further comprising segmenting the signal data set based on the assignment of data as one of the subject data and the background data.

54. The method of claim 51, further comprising evaluating the frequency distribution to identify a mode, wherein the first threshold for each signal data set is established based on a value of the point and a value of the mode.

* * * * *